United States Patent [19]
David

[11] 3,862,442
[45] Jan. 21, 1975

[54] ELECTRIC MOTOR ORBITOR STRUCTURE
[76] Inventor: Vernon J. David, Durham, Kans.
[22] Filed: May 18, 1972
[21] Appl. No.: 254,818

Related U.S. Application Data
[63] Continuation of Ser. No. 125,051, March 17, 1971, abandoned.

[52] U.S. Cl. .................... 310/46, 310/156, 46/235, 273/1 M
[51] Int. Cl. .......................................... H01k 21/12
[58] Field of Search .............................. 310/12–19, 310/103, 156, 46, 104, 162–64; 259/DIG. 46; 40/106.4; 46/235, 239; 273/136 A, 1 M, 145 R, 145 C, 145 CA, 145 D, 145 E

[56] References Cited
UNITED STATES PATENTS

| | | | |
|---|---|---|---|
| 1,630,490 | 5/1927 | Klopsteg | 40/106.45 |
| 1,736,613 | 11/1929 | McCoshen | 40/106.45 |
| 1,984,975 | 12/1934 | Lodder | 310/12 UX |
| 2,518,758 | 8/1950 | Cook | 259/DIG. 46 |
| 3,595,531 | 7/1971 | Williams et al. | 259/DIG. 46 |

FOREIGN PATENTS OR APPLICATIONS

| | | | |
|---|---|---|---|
| 1,151,246 | 7/1963 | Germany | 259/DIG. 46 |

*Primary Examiner*—Donovan F. Duggan

[57] ABSTRACT

This invention relates to electric motor structures and, specifically, to electric motor structures having permanent magnet, self starting rotor means cooperating with a stator member. More particularly, this invention relates to an orbitor structure having alternating current stator structures and various types of permanent magnet type rotor means adapted to be placed within guide track structures for new and novel movement thereof. Additionally, this invention relates to an electric motor structure utilizing a spherically shaped permanent magnet rotor means operable within a suitable track or hollow sphere structure having the rotor moveable in one or a plurality of planes at different and not necessarily synchronous speeds.

1 Claim, 16 Drawing Figures

PATENTED JAN 21 1975

INVENTOR.
VERNON J. DAVID
BY
Phillip A. Rein
ATTORNEY

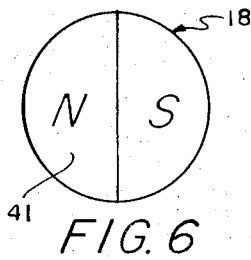
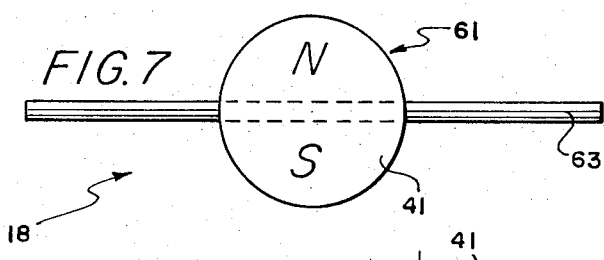
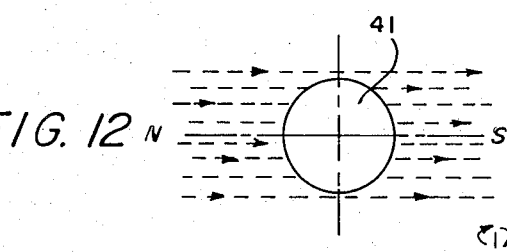
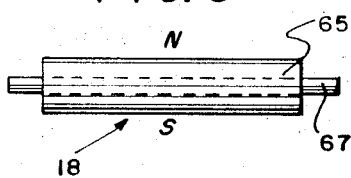
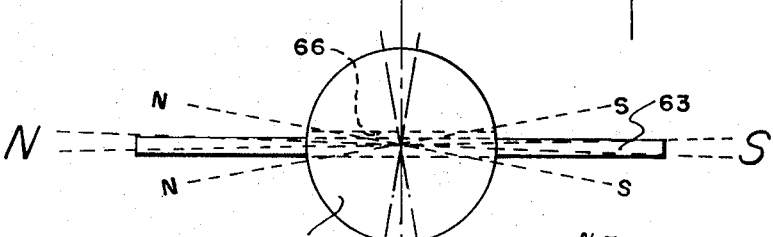
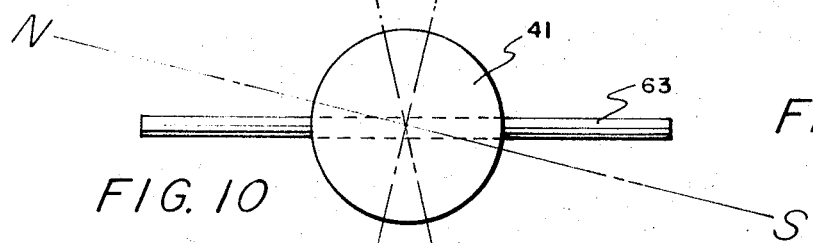
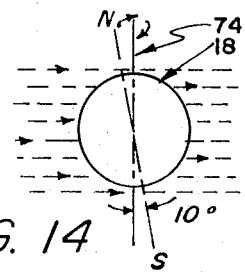
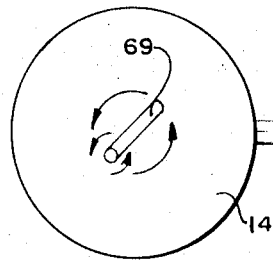
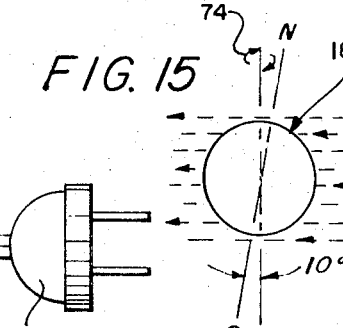
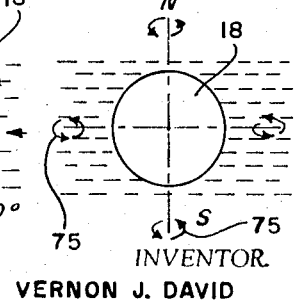

ELECTRIC MOTOR ORBITOR STRUCTURE

This application is a continuation of application Ser. No. 125,051, filed Mar. 17, 1971, now abandoned.

This invention is an improvement over the applicant's issued patent entitled "Alternating Current Electric Motor", issued on Apr. 2, 1968, U.S. Pat. No. 3,376,442.

There are numerous types of permanent magnet rotor and stator motors known to the prior art being alternating current motors but the prior art devices have stators which are in a fixed position for rotation thereof. Additionally, it has been found that the majority of the prior art magnet rotor type motors utilize permanent magnets which lose their magnetism over a period of time thereby losing power and efficiency and not being of satisfactory operation. None of the prior art devices are rotatable about an infinitely variable axis in alternative positions and at a wide range of speeds.

In one preferred embodiment of this invention, an electric motor orbitor structure is provided including a main support stator member; a guide structure member which may be mounted on the stator member; and a rotor means associated therewith. The stator member is of generally cylindrical shape having a main body enclosed by an outer cover so as to achieve a generally flat, disc shape. The main body is provided with a coil member having the same provided with electrical energy by the connection of terminal members to a cord member which may be inserted through a conventional plug member into a 110 volt outlet power source. Centrally of the coil member is provided a core member of ferro magnetic material for proper operation thereof. The guide track structure is preferably constructed of a transparent material and includes a first circular track member and a second spherical retaining track member. The circular track member is of a generally cylindrical shape having a groove similar to a bearing race centrally thereof so as to provide a semi-circular track and having a top surface provided with a circular opening so as to place a circular rotor means therewithin as desired. The circular track member is preferably constructed of a size similar in diameter and shape to that of the stator member for proper operation. The spherical retaining track member is of a transparent material having a rotor means therewithin for desired movement on receiving required energy and force from the stator member. The rotor means is provided with a plurality of numerous rotor structures having one embodiment being (1) a spherical rotor member having half sections formed with north and south magnetic poles; (2) a second embodiment having a similar spherical rotor member mounted on a central shaft; (3) a third embodiment having a cylindrical rotor member mounted upon an elongated shaft; (4) a fourth embodiment having a spherical rotor member having an enlarged diametrical opening therethrough so as to loosely fit on a shaft member; and (5) an elongated cylindrical shaft rotor member. It is noted that the rotor structures are constructed of a special ferro-magnetic material so that the same may be readily compressed and formed in desired shapes so as to isolate north and south magnetic poles to achieve the new and novel automatic operation of the orbitor structure of this invention.

One object of this invention is to provide a new and novel alternating current electrical motor orbiting structure which may be utilized as a novelty, toy actuator, or numerous other practical uses.

Another object of this invention is provided an orbitor structure having a stator member adapted to receive a guide track structure thereon whereupon a spherical rotor means can be mounted therein for orbiting in various paths of movement at synchronous or non-synchronous speeds.

Still, one further object of this invention is to provide a new and novel alternating current electric motor having a rotor means which is rotatable in various paths at synchronous or non-synchronous speeds without any physical connection to a stator structure.

One further object of this invention is to provide an improved alternating current electric motor orbitor structure having rotor means movable in various desired paths of oscillation and rotation so that the same has new and novel applications in both practical and novelty fields.

Still, another object of this invention is to provide an orbitor structure having rotor means made of highly orientated metal ferrite material and provided with guide track structures to receive rotor means thereon for movement in various paths and directions.

Various other objects, advantages, and features of the invention will become apparent to those skilled in the art from the following discussion, taken in conjunction with the accompanying drawings, in which:

FIG. 6 is an elevational view of a spherical rotor member of the orbitor structure of this invention;

FIG. 7 is another embodiment of a rotor member of this invention having a spherical rotor member rotatable on an elongated shaft;

FIG. 8 is another embodiment of a rotor means of this invention illustrating an elongated cylindrical rotor member mounted on a central, axially extended shaft element;

FIG. 9 is another embodiment of a rotor member similar to that shown in FIG. 6 except having a spherical rotor member loosely mounted upon a central shaft member;

FIG. 10 is another embodiment of a rotor means of this invention having a rotor member secured to a central fixed shaft;

FIG. 11 is a top plan view of a third embodiment of the orbitor structure of this invention illustrating an elongated cylindrical rotor member on a stator member;

FIGS. 12 and 13 illustrate the use of a spherical rotor member with the alternating magnetic forces acting thereon;

FIG. 14 is a view similar to FIG. 13 illustrating the magnetic forces upon a spherical rotor member for obtaining wobble type movement; and FIGS. 15 and 16 are schematic diagrams illustrating the magnetic forces acting on the rotor means of this invention having spherical rotor members mounted on respective shafts.

Figure 1:
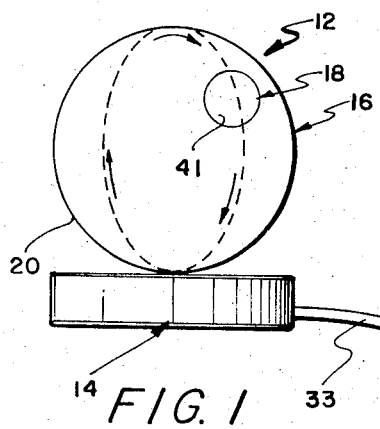
FIG. 1 is a side elevational view of one embodiment of the orbitor structure of this invention.

The following is a discussion and description of preferred specific embodiments of the new orbitor structures of this invention, such being made with reference to the drawing, whereupon the same reference numerals are used to indicate the same or similar parts and/or structures. It is to be understood that such discussion and description is not to unduly limit the scope of the invention.

Referring to the drawings in detail and in particular to FIG. 1, an electric motor orbiting structure is provided indicated generally at 12, including a main stator member 14; a guide track structure 16 mounted thereon; and a rotor means 18 operably associated with the guide track structure 16. In this first embodiment, the guide track structure 16 is a spherical retaining track member 20 preferably constructed of a transparent material having the rotor means 18 either permanently or releasably contained therein.

The stator member 14 is of a generally disc shape including a main body 22 covered by an outer insulated cover 24 and having a cord and plug assembly 25 connected thereto. The outer cover 24 may be constructed of a non-magnetic material such as fiberboard, plastic, fiberglass, etc. The stator body 22 is of a non-electric material having mounted therewithin a cylindrical coil 27 connected by terminal members 29 to the cord and plug assembly 25. Centrally of the cylindrical coil 27 is mounted an inner core member 31 for the proper operation thereof as will be explained. The cord and plug assembly 25 includes an elongated cord 33 having electrical connection to the terminal members 29 and an inner knot indicated at 36 within a cylindrical opening 37 in the main body 22 so as to prevent the same from being disengaged therefrom. The outer end of the cord 33 is connected to a plug member 39 having dual prongs so as to be placed within a 110 volt electrical outlet in a conventional manner so as to receive electrical power and generate the magnetic field.

The electrical core member 31 is of a cylindrical shape so as to generate the magnetic field thereby. The core member 31 is preferably of a soft iron material positioned in the center of the coil 27. The core member 31 can be made of any suitable ferro-magnetic substance having a high value of relative permeability and, such materials in the ferro-magnetic elements found suitable for such use are iron, nickel, cobalt, and alloys including combinations of the same. The core member 31 decreases the reluctance of magnetic paths of the magnetic field generated by the coil 27 and prevents strain in the lines of magnetic flux making possible a more powerful motor.

The rotor means 18, as disclosed in the embodiment of FIG. 1, is a spherical rotor member 41 formed in half sections of North and Souths poles as shown in FIG. 6. It is obvious that the spherical rotor member 41 can be provided with a central encased magnetic sphere having an outer cover insulation material which can be made in various colors so as to be attractive in appearance. The spherical rotor member 41 has dissimilar poles on opposite sides of semi-circular shape as shown by the indications N and S for North and South, respectively, (FIG. 6). The material of the rotor member 41 is of a permanent magnet of any suitable type material but, more preferably, a metal ferrite, magnesium ferrite, or mixtures thereof. However, the most desirable has been found to be a rotor member 41 constructed of highly orientated barium ferrite which is compressed into the desired shape under high pressure and subsequently sintered in a high temperature furnace and then magnetized. It is to be noted that this process can be utilized to produce rotor members 41 of various shapes and sizes as will become obvious. Other such materials which are very suitable in making permanent magnet rotor means 18 of this invention is clearly set forth in the applicant's issued U.S. Pat. No. 3,376,442.

In the use and operation of the orbitor structure 12 as shown in FIG. 1, it is seen that the plug member 39 is placed within a conventional 110 volt outlet and the spherical retaining track member 20 with the spherical rotor member 41 therewithin is placed on the top surface thereof. At this time, the forces generated from the alternating current stator member 14 tends to present a rocking movement of the rotor member 41 and, due to its lightweight characteristics, the rotor member 41 will achieve an automatic rotation thereof as shown in FIG. 1 and various paths of movement so as to be quite fascinating and exciting as a toy device. Additionally, it is noted that movement of the spherical retaining track member 20 to one side or the other of the upper flat surface of the stator member 14 would cause various and changing to act upon the permanent magnet rotor member 41 so as to move in different paths and, additionally, in either synchronous or non-synchronous speeds. Therefore, it is seen in this embodiment that a new and novel movement of the rotor member 41 can be achieved in a most efficient and effective manner.

Figure 2:
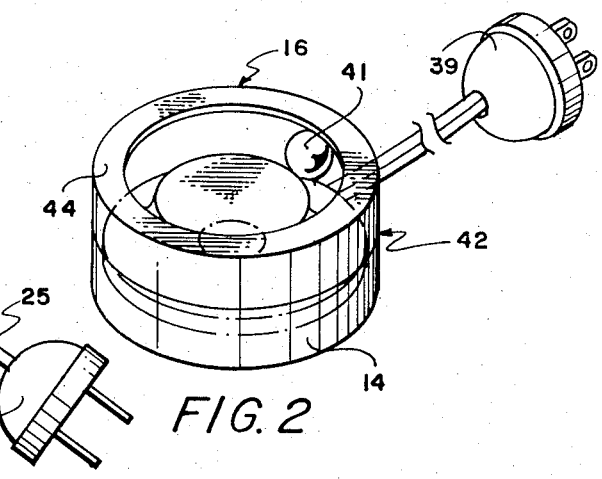
FIG. 2 is a perspective view of the second embodiment of the orbitor structure of this invention.
Figure 3:
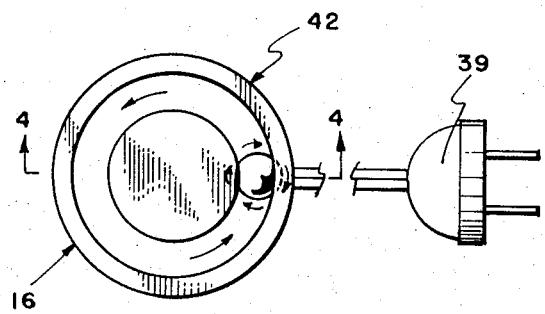
FIG. 3 is a top plan view of the orbitor structure as shown in FIG. 2.
Figure 4:
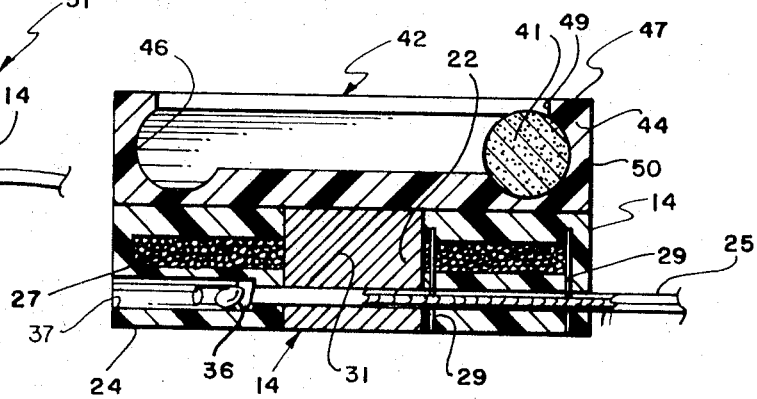
FIG. 4 is an enlarged sectional view taken along line 4—4 in FIG. 3.

Another embodiment of this invention is shown in FIGS. 2-4, inclusive, wherein an orbitor structure 42 is provided having the previously described stator member 14; one of the spherical rotor members 41; and the guide track structure 16 being a circular track member 44.

The circular track member 44 is of a disc shape having a central internal race similar to that constructed for bearing members except being open in the center with a semi-circular track 46 adapted to receive the spherical rotor member 41 therewithin. An upper surface 47 of the circular track member 44 is provided with a large opening 49 for adding or subtracting rotor members 41 thereto.

In the use and operation of the second embodiment being the orbitor structure 42, it is seen that the circular track member 44 is placed on the upper flat surface of the stator member 14 whereupon the plug member 39 can be placed within a conventional 110 volt power source. Thereupon, the spherical rotor member 41 is placed within the semi-circular guide track 46 and the alternating magnetic forces act on the same to rotate at a considerable speed therewithin and the speed can be changed by movement of the circular track member 44 relative to the stator member 14. Additionally, it is to be noted that the circular track member 44 can also be placed on an outer edge 50 supported on the stator member 14 so as to provide movement of the spherical rotor member 41 in a circular path about a horizontally extended axis. Also, a plurality of rotor members 41 can be placed within the track member 44 with non-magnetic spacer balls, if desired, for a new and novel operation.

Figure 5:
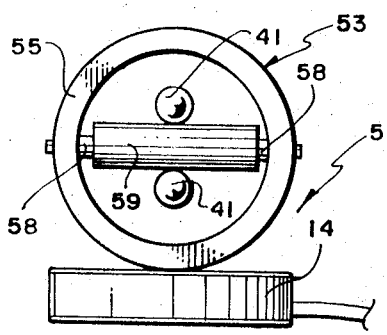
FIG. 5 is a side elevational view of another embodiment of the orbitor structure of this invention.

A third embodiment of an orbitor structure 51 is shown in FIG. 5 wherein the stator member 14 is provided; a rotor assembly 53; and at least a pair of spherical rotor members 41.

The rotor assembly 53 includes a support ring member 55 having opposed holes for receiving shaft portions 58 secured to a permanent magnet rotor element 59. The rotor element 59 is preferably of cylindrical shape having half sections magnetized into North and South poles. The ring member 55 and shaft portions 58 are constructed of a non-magnetic material with the rotor element 59 freely rotatable about the axis of the shaft portions 58.

The rotor assembly 53 is similar to that shown in FIGS. 6 and 7 of the applicant's U.S. Pat. No. 3,376,442.

In the use and operation of the orbitor structure 51 of this invention, the stator member 14 is energized as previously discussed, and the spherical rotor members 41 are mounted on the rotor element 59 of the rotor assembly 53 as shown in FIG. 5. This combination of rotor members 41 and rotor assembly 53 is then placed on the stator member 14 and the rotor element 59 rotates about its shaft portions 58. The permanent magnetic rotor members 41 establishes a magnetic coupled relationship with the rotor element 59 and rotate synchronously with it. During this movement, the rotor members 41 maintain a relatively fixed position to the stator member 14. The rotor members 41 can rotate at great speed without generating appreciable centrifugal force as rotating about there own axis and being enmeshed magnetically with the rotor element 59. It is to be noted a plurality of rotor members 41 may be used and may easily change locations relative the rotor element 59 in accordance with various magnetic conditions. This orbitor structure 51 is valuable as a teaching device with the rotor element 59 being a rudimentary "Nucleus" and the rotor members 41 resembling orbiting "Electrons."

Other embodiments of the rotor means 18 are shown in FIGS. 7, 8, 9, 10, and 11 of the drawings. More specifically, the rotor means 18 further includes a shaft mounted rotor member 61 having a spherical rotor member 41 solidly mounted on an elongated shaft 63; a cylindrical rotor member 65 as shown in FIG. 8 secured to a shaft element 67; a spherical rotor member 41 similar to FIG. 7 in FIG. 9 having a centrally elongated opening 66 of greater size than the elongated shaft 63 therethrough; and a cylindrical rotor member 69 as shown in FIG. 11.

It is noted that the use of the spherical rotor member 41 mounted upon the shaft 63 of FIG. 7 provides a new and novel unusual wobbling motion which is quite effective when mounted within the spherical retaining track member 20 so as to achieve new and novel movements thereof.

Additionally, the spherical rotor member 41 loosely mounted on the central shaft 63 provided with the North and South poles results in a wobbling movement as indicated in FIG. 9 about a central axis being approximately 10° or the like to each side of the axis.

As shown in FIG. 11, the cylindrical rotor member 69 is constructed so as to have greater forces acting on opposite ends so as to have a generally vertical extended wobble action. It is noted that this embodiment would be quite novel in utilization as a swizzle stick or the like when mounted within a glass which has been placed upon the stator member 14.

FIGS. 12 and 13 shows the principal of operation of a spherical rotor member 41 wherein the alternating lines of magnetic force generated by the stator member 14 acting on the magnetic halves of the rotor member 41 causes the rotation as shown by the arrows 73 in FIG. 13.

FIGS. 14 and 15 illustrate rotational movement of the rotor means 18 in FIGS. 9 and 10 generating the wobble type movement showing rotation of about 10° to each side of the central upright axis as shown by the arrows 74. This movement need not be synchronous and very slow rotational speeds are obtainable.

In FIG. 16 is shown the possible movement of a spherical rotor means 18 about two planes indicated by the arrows 75. In other words, free orbiting movement is obtainable with planes of rotation virtually unlimited.

It is seen that the various embodiments of the alternating current orbitor structures of this invention can be used for a wide variety of purposes being practical and novelty toy items. This invention is particularly important in providing axial rotational and oscillating or wobbly movements of a rotor member which may appear to float in space without apparent connection to a power generating stator member. Typical examples of such possible applications of this invention are liquid pumps for corrosive liquids aeriating gold fish bowls and big storage tanks; mixing apparatus for food products; mixing liquids; and providing new and novel movements as a toy item which movement can be controlled by the operator by movement of the respective guide track structure relative to the stator member.

While the invention has been described in conjunction with preferred specific embodiments thereof, it will be understood that this description is tended to illustrate, not to limit, the scope of the invention which is defined by the following claims.

I claim:

1. An orbitor structure being a synchronous, alternating current, self starting, electric motor comprising:
   a. a stator member having a coil with terminals on said coil connectable to a source of alternating current power,
   b. a rotor member positioned in the magnetic field generated by said stator member,
   c. said rotor member having integral magnetic poles with at least one pole within the magnetic field generated by said stator members,
   d. a guide track structure in operable engagement with said stator member to receive said rotor member and to confine movement of said rotor member within certain areas and about a plurality of paths of motion,
   e. said guide track structure being of a spherical shape and completely enclosed having said rotor member mounted therewithin, said rotor member is movable in numerous paths in a generally circular motion confined only by the spherical shape and inner surface of said guide track structure,
   f. said rotor member of a spherical shape having half spherical sections of different magnetic poles movable in unlimited rotational paths in said guide track structure, and
   g. said guide track structures of spherical shape being rotatable on said stator member to achieve variable movement of said rotor member.

* * * * *